(Model.)
J. NAGELE.
Vehicle Wheel Hub.
No. 239,184. Patented March 22, 1881.
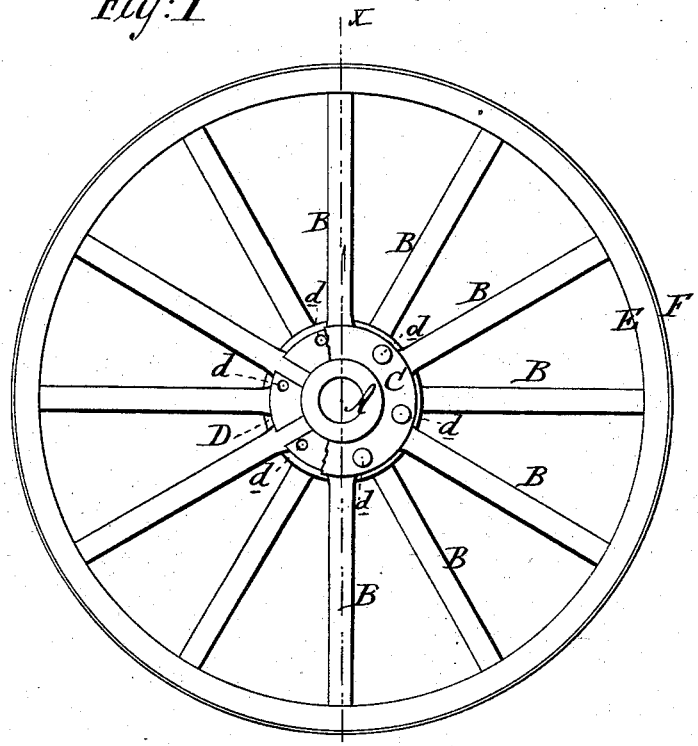
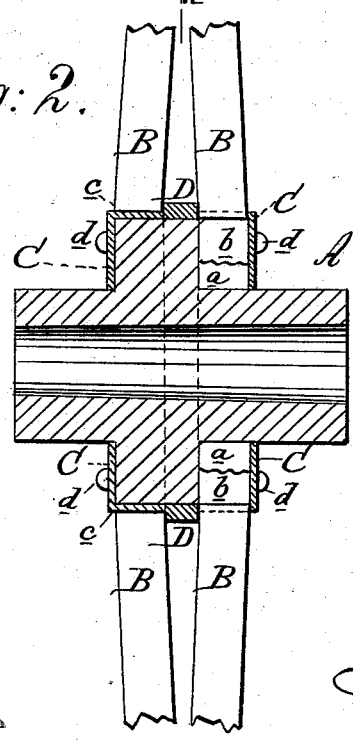
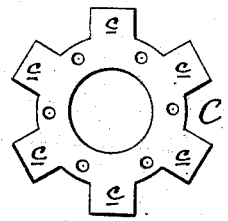
WITNESSES:
A. Schehl
C. Sedgwick
INVENTOR:
J. Nagele
BY Munn & Co
ATTORNEYS.
N. PETERS, PHOTO-LITHOGRAPHER, WASHINGTON, D. C.

UNITED STATES PATENT OFFICE.

JOHN NAGELE, OF CLARENDON, ARKANSAS.

VEHICLE-WHEEL HUB.

SPECIFICATION forming part of Letters Patent No. 239,184, dated March 22, 1881.

Application filed September 17, 1880. (Model.)

*To all whom it may concern:*

Be it known that I, JOHN NAGELE, of Clarendon, in the county of Monroe and State of Arkansas, have invented a new and Improved Vehicle-Wheel, of which the following is a full, clear, and exact description.

The object of this invention is to provide a stronger and more durable wheel, designed especially for buggies and light wagons, but adapted, also, to heavy vehicles.

The invention consists of a hub provided with open-sided spoke-mortises for staggering spokes, of annular caps or flanges fitted over the ends of the hub against the outer faces of the spoke-tenons, and of a projecting band or collar, in combination therewith, that encircles the hub between the two sets of spokes and supports them on their inner faces.

Figure 1 is a front elevation of the wheel. Fig. 2 is an enlarged vertical sectional elevation of the same on line $x\ x$, Fig. 1. Fig. 3 is a plan of a hub-cap.

Similar letters of reference indicate corresponding parts.

In the drawings, A represents the hub provided with open-sided spoke-mortises $a\ a$, whereby the spokes B B can be driven in and secured more firmly than in ordinary hub-mortises.

C C are annular metal caps or flanges, provided with radiating square points $c\ c$. Said caps C C are set over the ends of the hub A, and against the faces of the enlarged portion thereof, and against the outer faces of the spoke-tenons $b\ b$, as shown; and the radiating points $c\ c$ are bent down on the periphery of the hub A, in the interspaces between the spokes B B, and there secured in some suitable manner, while bolts $d\ d$ are passed through said caps C C and hub A from side to side between the spokes B B, for the purpose of holding said caps C C, and thereby assisting in holding the spokes B B in place.

D is a deep metal band or collar encircling the hub A between the two sets of spokes B B, which are arranged alternately on each side of it, and supporting the inner sides of each set of said straddling spokes B B.

E represents the felly, and F the tire, of the wheel.

It will be seen that the caps C C and collar D serve not only to hold the spokes B B more firmly in the hub A, but they also serve to strengthen the said hub, to protect it from the weather and to prevent its cracking.

Having thus described my invention, I claim as new and desire to secure by Letters Patent—

The combination, with a wooden wheel provided with open-sided spoke-mortises $a$, of the metallic caps C C, bent over and notched to straddle each spoke of a row, and the metallic band D, arranged between the two rows of spokes, as shown and described.

JOHN NAGELE.

Witnesses:
 ASA FRANKLIN,
 A. W. HARRIS.